(12) United States Patent
Christensen et al.

(10) Patent No.: US 6,990,685 B1
(45) Date of Patent: Jan. 24, 2006

(54) SYSTEM AND METHOD FOR TRACKING BOOTABLE DEVICES

(75) Inventors: Michael D. Christensen, Round Rock, TX (US); Mukund Purshottam Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1013 days.

(21) Appl. No.: 09/596,753

(22) Filed: Jun. 15, 2000

(51) Int. Cl.
*G06F 11/30* (2006.01)
*G06F 15/177* (2006.01)

(52) U.S. Cl. .......................... 726/34; 713/2
(58) Field of Classification Search ............... 713/200, 713/201, 2; 726/34
See application file for complete search history.

(56) References Cited

U.S. PATENT DOCUMENTS

| | | | | |
|---|---|---|---|---|
| 5,274,816 A | 12/1993 | Oka | .......................... | 396/700 |
| 5,448,741 A | 9/1995 | Oka | .......................... | 395/700 |
| 5,577,219 A | 11/1996 | Timko et al. | ............... | 395/411 |
| 5,761,448 A * | 6/1998 | Adamson et al. | ........... | 710/104 |
| 5,822,582 A | 10/1998 | Doragh et al. | ............... | 395/652 |
| 5,854,905 A | 12/1998 | Garney | ........................ | 395/284 |
| 5,860,001 A | 1/1999 | Cromer et al. | ............... | 395/651 |
| 5,870,554 A | 2/1999 | Grossman et al. | ...... | 395/200.52 |
| 6,189,063 B1 * | 2/2001 | Rekeita et al. | .............. | 710/311 |
| 6,519,671 B1 * | 2/2003 | Kondou et al. | .............. | 710/311 |

OTHER PUBLICATIONS

Pending U.S. Appl. No. 08/984,386, entitled "A Method for Changing the Mappingn of Partitions to Logical Drives Without Requiring that the System be Rebooted" by Beelitz; Dell U.S.A., L.P. (DC-01313), Dec. 3, 1997.
Pending U.S. Appl. No. 09/490,523, entitled "System and Method for Managing the Boot Order of a Computer System" by Bollian, et al.: Dell U.S.A., L.P. (DC-02096), Jan. 25, 2000.

* cited by examiner

*Primary Examiner*—Gilberto Barrón, Jr.
*Assistant Examiner*—G. Gurshman
(74) *Attorney, Agent, or Firm*—Baker Botts L.L.P.

(57) ABSTRACT

A system and method for tracking bootable devices are disclosed which provide significant advantages over current computer system device management techniques. A system incorporating teachings of the present disclosure may include one or more installed bootable devices and a computer readable medium storing identification data for each of the installed bootable devices. The identification data may include host bridge identification data.

20 Claims, 2 Drawing Sheets

SYSTEM AND METHOD FOR TRACKING BOOTABLE DEVICES

TECHNICAL FIELD

The present disclosure relates generally to computer systems and, more particularly, to a system and method for tracking bootable devices.

BACKGROUND

Computer systems, especially server systems, can generally be configured to boot from one of several available devices in the computer system. In some systems, a user may be able to specify the preferred boot device or boot order of the computer system. For example, the user of a computer system may instruct the computer system to boot from a specific hard drive, magnetic disk, CD-ROM or other bootable device.

In the case of a computer system having one or more PCI buses, the computer system may boot from any one of the bootable devices coupled to any one of the PCI buses. To facilitate this flexibility, the PCI buses of a multiple PCI bus system may be numbered. In general, the first PCI bus is numbered 0 and the remaining PCI buses are numbered sequentially from 0. Similarly, the devices coupled to each of the sequentially numbered PCI buses may be identified by a device number and a function number. Thus, each device coupled to a PCI bus may be identified by its PCI bus number, device number and function number. As an example, the first device on the first PCI bus may be identified as device 0 on PCI bus 0 with function number 1, the second device on the first PCI bus may be identified as device 1 on PCI bus 0 with function number 0, and so on.

However, the removal of a PCI device from or the addition of a PCI device to the computer system may cause a change in the sequence in which the PCI devices are invoked or numbered. As a result, this new sequence of PCI devices may not match a stored sequence of PCI devices when the new sequence is compared to the previous sequence during the current boot of the computer system. Subsequently, one or more newly added or removed bootable devices may alter the priority of existing bootable devices, thereby resulting in boot errors. As a further result, current selectable boot order techniques occasionally fail to correctly identify plug and play (PnP) expansion headers associated with each bootable device through power cycles when a bootable device is added to or removed from the computer system. In addition, conventional selectable boot order techniques are often unable to distinguish between an existing device and a newly added device when the newly added device is similar to the existing device.

SUMMARY

In accordance with teachings of the present disclosure, a system and method are disclosed for tracking bootable devices that provide significant advantages over current computer system boot device management techniques. In one aspect, the present disclosure provides a computer system having one or more installed bootable devices and a computer readable medium storing identification data for each of the bootable devices. The identification data preferably includes host bridge identification data.

In another aspect, a method is provided for uniquely identifying bootable devices coupled to one or more slots in a computer system. The method preferably includes comparing a bus number, device number and function number associated with each bootable device to a bus number, device number and function number associated with each slot. The method preferably further includes determining a host bridge number associated with each bootable device having a bus number, device number and function number matching the bus number, device number and function number of a slot. An identifier for each bootable device, based on at least the host bridge number and identification data maintained by the bootable device, is also preferably created according to the method.

In yet another aspect, a method is provided for identifying bootable devices in a computer system. The method preferably includes determining a bus number for each bootable device and subsequently determining a host bridge number associated with each bus of the computer system. The method preferably further includes reading identification data stored on each bootable device in the computer system and creating an identifier for each bootable device using the host bridge number and the identification data read from each bootable device.

One technical advantage provided by the present disclosure is the unique identification of bootable devices through repeated power cycles.

Another technical advantage provided by the present disclosure is the elimination of boot order errors resulting from the addition of bootable devices to a computer system.

Yet another technical advantage provided by the present disclosure is the ability for a user of a computer system to positively identify bootable devices including instances of multiples of the same device.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts. In particular, the present disclosure concerns a system and method for tracking or identifying bootable devices. The system and method described are especially useful in those instances in which similar bootable devices may be located in separate locations in the architecture of a computer system, such as when the computer system includes multiples of the same bootable device on a single PCI bus or in the case when the computer system includes multiple PCI buses, each having the same bootable device installed in a slot on respective PCI buses.

Figure 1:
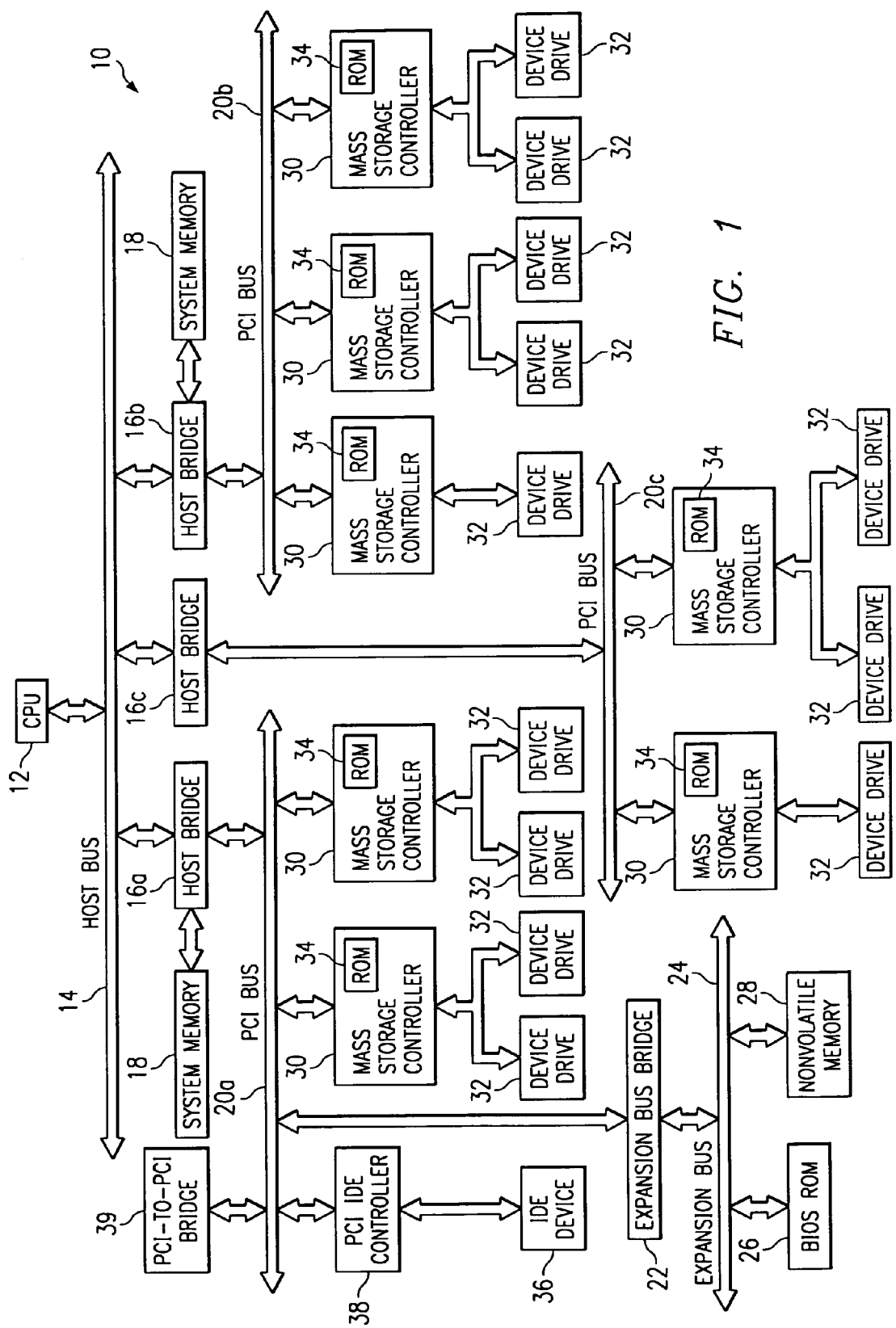
FIG. 1 is a schematic drawing showing a block diagram for one architecture of a computer system incorporating teachings of the present disclosure.

FIG. 1 illustrates a schematic block diagram of a computer system indicated generally at 10. Computer system 10 preferably includes central processing unit (CPU) 12 coupled to host bus 14. Also preferably coupled to host bus 14 are host bridges 16a, 16b and 16c, at least one of which is also preferably coupled to system memory 18. Host bridges 16a, 16b and 16c are preferably coupled to PCI buses 20a, 20b and 20c. Host bridge 16a is preferably coupled to PCI bus 20a, host bridge 16b is preferably coupled to PCI bus 20b and host bridge 16c is preferably coupled to PCI bus 20c.

Preferably coupled to PCI bus 20a is expansion bus bridge 22, which is preferably coupled to expansion bus 24. Expansion bus 24 may be an ISA bus, and expansion bridge 22 may be a PCI/ISA bridge. As an alternative, expansion bus 24 and expansion bridge 22 may operate according to another suitable standard. Preferably coupled to expansion bus 24 are BIOS ROM 26 and nonvolatile memory 28. Nonvolatile memory 28 may be NVRAM or CMOS memory. Preferably coupled to PCI bus 20a is PCI IDE controller 38, which is in turn preferably coupled to IDE device 36. PCI to PCI bridge 39 may also be preferably coupled to PCI bus 20a. PCI to PCI bridge 39 preferably allows one or more devices, bootable or otherwise, to be coupled thereto and generally adds one or more system buses to computer system 10.

In computer system 10 of FIG. 1, PCI buses 20a, 20b and 20c may operate at different speeds. For example, PCI bus 20a may operate at 33 MHz, while PCI buses 20b and 20c may operate at 66 MHz. Preferably coupled to PCI bus 20a are mass storage controllers 30. Preferably coupled to each mass storage controller 30 are device drives 32. Mass storage controllers 30 may include SCSI controllers, RAID controllers, or any other controller that is operable to manage the stored memory of a PCI device. Each mass storage controller 30 preferably includes an option BIOS ROM 34 that may feature BIOS extension code that may be used to configure device drives 32. As shown in FIG. 1, mass storage controllers 30 may manage multiple bootable device drives 32. As an alternative, mass storage controller 30 may manage a single bootable device 32. As illustrated, host bridge 16b is preferably coupled to PCI bus 20b as well as associated mass storage controllers 30 and device drives 32.

At each boot of computer system 10, the PCI buses 20a, 20b and 20c as well as any devices on each bus are typically numbered sequentially, with the PCI buses being numbered incrementally beginning at 0. Conventionally, each physical PCI slot is associated with a PCI device number, function number and bus number. The PCI device numbers of each PCI bus are typically numbered sequentially, beginning at 1, with the number 0 typically being reserved for the bridge. Similarly, the PCI function numbers are assigned based on a particular devices capabilities. For example, for a single function PCI devices, the function number is typically 0. For multi-function PCI devices, the function number may be a number in a range of suitable function numbers (0, 1, 2, ...). As an example, BIOS ROM 26 may recognize PCI bus 20a as PCI bus 0. First mass storage controller 30 on PCI bus 20a may be recognized by BIOS ROM 26 as PCI device 1 occupying slot 1 on PCI bus 0 and with a function number of 0.

As illustrated in FIG. 1, host bridge 16a may be numbered host bridge number 0 while host bridge 16b may be numbered host bridge number 1 and host bridge 16c may be numbered host bridge number 2. Coupled to host bridge number 0 is PCI bus 20a and expansion bus 24. PCI bus 20a may be numbered bus number 0 thereby giving host bridge number 0 the bus number range 0. Similarly, host bridge number 1 may have PCI bus 20b numbered bus number 1 giving host bridge number 1 the bus range of 1. Similarly, host bridge number 2 may have PCI bus 20c numbered bus number 2 giving host bridge number 2 the bus range of 2.

Depending upon the hardware included or installed in computer system 10, the numbering of the buses may change. Including PCI to PCI bridge 39 in computer system 10 typically causes such changes to occur. In one example, coupling PCI to PCI bridge 39 to a bootable device, such as mass storage controller 30, on one side and to PCI bus 20a on the other side may add an additional bus to computer system 10. Subsequently, referring back to the example mentioned above, PCI bus 20a may be numbered 0 and the additional bus resulting from the presence of PCI to PCI bridge 39 may be numbered 1. As a further effect, PCI bus 20b may subsequently be numbered 2 and PCI bus 20c may subsequently be numbered 3. Thus, host bridge 16a would now have a bus range of 0 through 1, host bridge 16b would have a new bus range of 2 and host bridge 16c would have a new bus range of 3. Similar to other devices coupled to a slot of computer system 10, PCI to PCI bridge 39 may be associated with the PCI device number, function number and bus number assigned to the slot to which it is preferably coupled.

In operation, the option BIOS ROM 34 of each mass storage controller may be queried by BIOS ROM 26 during setup in order to identify the mass storage controller 30. As an example, one mass storage controller 30 may identify itself, following a query by BIOS ROM 26, as an "XYZ Co. Model 001 SCSI Controller." The system and method of the present disclosure preferably permits the user to identify the bootable devices of the system by associating, as part of a setup program, the name of the mass storage controller 30 and the PCI slot number to which the mass storage controller 30 is connected.

Figure 2:
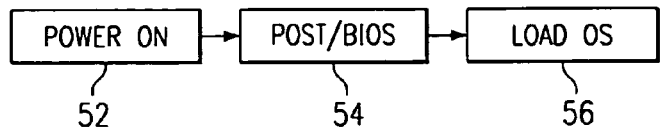
FIG. 2 is a schematic drawing showing a block diagram for one operation cycle of a computer system incorporating teachings of the present disclosure.

FIG. 2 is a flow diagram depicting a method for identifying bootable devices according to teachings of the presently disclosed system and method. Computer system 10 is powered on at step 52 causing computer system 10 to perform one or more initialization routines and to eventually load an operating system for computer system 10. In response to being powered on at step 52, computer system 10 preferably enters a POST (Power On Self Test) routine and/or BIOS (Basic Input/Output Systems) routine at step 54 (POST/BIOS). As mentioned above, the BIOS routine performed at step 54 may be stored, in part, on BIOS ROM 26.

The POST/BIOS routine initiated at step 54 generally includes a series of tests that are performed on computer system 10. Additionally, a series of component initializations and configurations may also occur during the POST/BIOS routine. For example, a POST routine may begin by transmitting an electrical signal along a programmed path to CPU 12 to clear leftover data from the CPU's 12 internal memory registers and to reset the program counter of CPU 12 to the address of the next instruction to be processed by CPU 12. In general, the address of the next instruction leads CPU 12 to a ROM chip that contains computer system's 10 BIOS such as BIOS ROM 26.

Upon executing the instruction located in the BIOS ROM 26 pointed to by CPU 12, a program which invokes a series of computer system 10 checks is preferably initiated. Preferably included in computer system 10 checks are a check of CPU 12 and a check of the POST routine. CPU 12 also preferably sends signals over the system buses to ensure components attached thereto are all generally functioning. A verification that a keyboard (not expressly shown) is properly attached and a determination of whether or not any keys have been pressed may also be performed during startup of computer system 10. A mouse (not expressly shown) may be similarly tested. The system timer or real-time clock may also be tested to ensure all of the computer system's 10 operations function in an organized, synchronized manner.

The POST routine preferably tests any memory contained on a display adapter and the video signals that control an associated display or monitor (not expressly shown). Should the memory of the display adapter contain add-in BIOS code specific to the display adapter, that add-in BIOS code may be made part of computer system's 10 overall BIOS at step 54 and to computer system's 10 memory configuration. The POST routine also preferably runs a series of tests to ensure system memory 18 is functioning properly. One method of testing system memory 18 is to write data to each system memory 18, read the data written and compare what was read to what was written.

During execution of the POST/BIOS routine by computer system 10, the components of computer system 10, including PCI buses 20a, 20b and 20c and the PCI devices of computer system 10, may be identified. One portion of the identification process involves BIOS ROM 26 reading header information that may be included on each bootable device. The header information of each bootable device is typically stored in the option BIOS ROM 34 of the bootable device and generally includes a vendor identification (ID) and a device identification (ID) therein. During a subroutine known as PCI enumeration, the computer system may associate each bootable device with a PCI device number, function number and bus number, as mentioned above.

As a part of the overall system BIOS, or as a separate routine, a PnP (Plug and Play) BIOS may also execute. Whether integrated into the overall system BIOS or as a separate program, the goals of the PnP BIOS are generally the same. One goal of the PnP BIOS is to look for special add-in ROM signatures which indicate that a block of add-in BIOS code for an expansion board or other PnP device follows. The PnP BIOS typically adds a pointer to this add-in signature to indicate to the system BIOS code the location of an expansion header or chain of headers.

Using this pointer, the system BIOS may then identify each PnP device, read through its add-in BIOS code and find each header. Information encoded in an expansion header may include the type of devices coupled to the expansion board, vendor and device IDs as well as the location of code that may be used to boot computer system 10. A device indicator may also be included in the expansion header that indicates whether the ROM on the expansion board may initialize as a device driver, be shadowed, be cached, or operate as a boot, display or input device. A device type code may also be utilized to aid the system BIOS in determining which devices may be used for booting the system as well as identifying what kind of peripheral is connected through the expansion board.

Once the POST/BIOS and/or the PnP BIOS have completed interrogating computer system 10 to determine operability as well as to collect a listing of the hardware attached to computer system 10, the information associated with the attached hardware is preferably stored in nonvolatile memory, such as NVRAM. Boot tables for the current configuration may then be built based on the gathered information.

In general, during each boot of computer system 10, a new boot table, listing an identifier for each bootable device in a computer system, is built to reflect the bootable devices present in computer system 10 on the current boot. Once the new boot table has been built, a boot table indicative of the bootable device configuration present on the previous boot of computer system 10 is preferably read from storage. Subsequently, the newly built boot table may then be compared with the boot table read from storage to determine if any new bootable devices are present in computer system 10. It is at this stage of startup that previous methods for tracking bootable devices have been unable to consistently identify new bootable devices through each power cycle or to uniquely identify more than one similar bootable device present in computer system 10. As such, the present disclosure teaches a method and system for uniquely identifying bootable devices wherein the unique identifiers may be used to at least build new boot tables as well as to compare new boot tables to previous configuration boot tables during startup.

Figure 3:
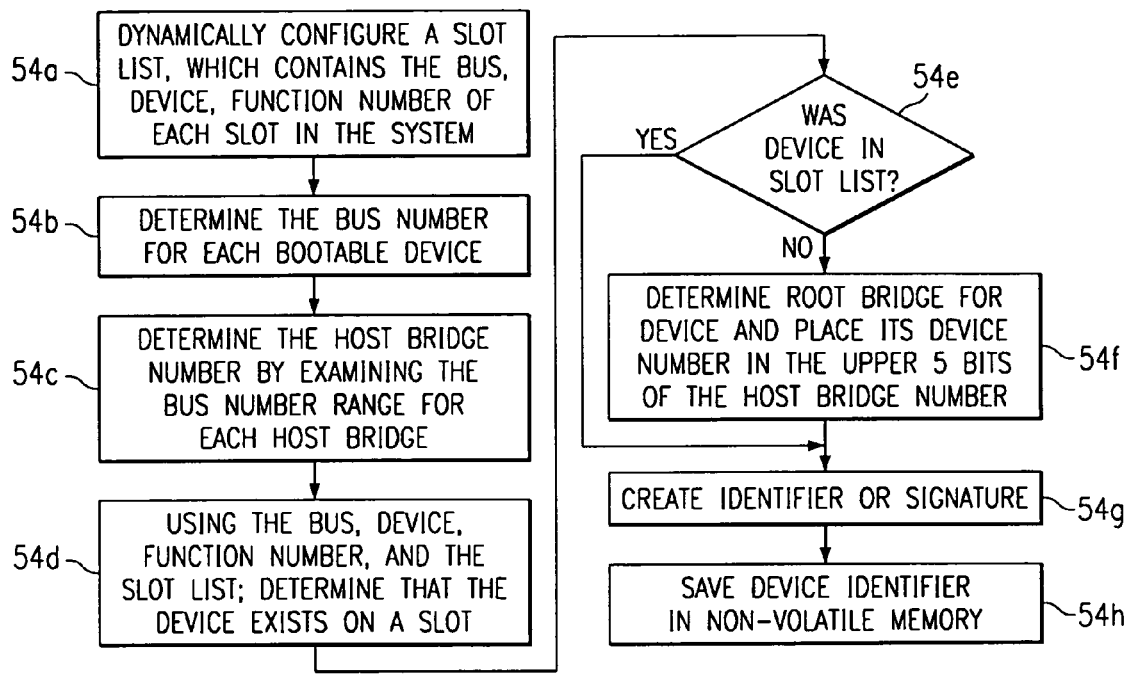
FIG. 3 is a schematic drawing showing a flow diagram depicting a method of identifying bootable devices in a computer system incorporating teachings of the present disclosure.

Referring now to FIG. 3, a flow diagram depicting a method for identifying bootable devices in a computer system is illustrated. According to teachings of the present disclosure, there are a plurality of variables which are preferably employed to uniquely identify the bootable devices of computer system 10.

In one embodiment, the bootable devices are uniquely identified by a six byte (forty eight bit) identifier. The identifier preferably includes a thirty two bit device ID. The device ID preferably includes a sixteen bit PCI device ID and a sixteen bit PCI vendor ID, each of which may be read from memory preferably included on the device being identified. The identifier preferably further includes a sixteen bit device signature. The device signature preferably includes a three bit PCI function number, a five bit PCI device number, a three bit PCI host bridge number and a five bit PCI root bridge or PCI slot device number, when necessary.

Beginning at step 54a, the method for identifying bootable devices depicted in FIG. 3 preferably configures a slot list for computer system 10. Preferably included in the slot list configured at step 54a are the PCI bus number, device number and function number associated with each slot of computer system 10. This slot list is preferably stored in a memory, such as system memory 18, for later use and may be discarded upon use.

At step 54b, the bus numbers for the individual bootable devices are obtained/determined. One method for determining the bus numbers for the individual bootable devices includes reading the bus numbers for each device from nonvolatile memory 28 where previously stored. Other methods of obtaining the bus number for the bootable devices of a computer system are considered within the scope of the present disclosure.

At step 54c, characteristics of the chipset employed by the motherboard (not expressly shown) of computer system 10 may be used to determine a bus number range for each host bridge, such as host bridges 16a, 16b and 16c. One such method involves executing an embedded command that is operable to obtain and provide the bus number range information for each host bridge 16a, 16b and 16c of computer system 10. The bus number range information may then be used to associate a host bridge number with each device based on the bus number for each device obtained at step 54b. Other methods of obtaining the bus number range for a given host bridge 16a, 16b and 16c or set of host bridges are considered within the scope of the present disclosure. As mentioned above, the bus number range for each host bridge 16*a*, 16*b* and 16*c* may change depending on the device or devices preferably coupled thereto.

At step 54*d*, the PCI bus number, device number, function number and slot list are preferably employed to determine whether or not a bootable device exists on a slot, i.e., is directly coupled to a slot, not coupled through a PCI to PCI bridge 39 to a slot, at step 54*e*. To make such a determination, the characteristic of computer system 10 mentioned above which assigns the PCI bus, function and device number for a given slot to a device located therein or coupled thereto is employed. Accordingly, the PCI bus, function and device number for each slot may be compared to the PCI bus, function and device number for the individual bootable devices. When the PCI bus, function and device number for a slot matches the PCI bus, function and device number for a bootable device, it may be determined that the bootable device exists in a slot and the method illustrated in FIG. 3 may proceed to 54 g.

When one or more PCI to PCI bridges 39 are included in computer system 10, a particular bootable device's PCI bus, function and device number generally will not match the PCI bus, function and device number of any of the slots in the computer system 10. As mentioned above, this configuration generally results in the PCI to PCI bridge 39 itself being assigned the PCI bus, function and device number of the slot to which it is preferably coupled. Any bootable devices which may be preferably coupled to PCI to PCI bridge 39 would generally have their bus, function and device numbers dictated by settings included on each bootable device. Accordingly, if at step 54*e* the PCI bus, function and device number of a bootable device is not matched to a PCI bus, function and device number of a slot in the slot list configured at step 54*a*, the method depicted in FIG. 3 proceeds to step 54*f*.

At step 54*f*, the identification of the slot or root bridge to which an unmatched bootable device is attached may be determined. As mentioned above, the PCI bus, function and device numbers of a slot are generally assigned to the device which is preferably coupled thereto. As such, a PCI to PCI bridge 39 with a bootable device preferably coupled thereto may be enumerated during system startup with the PCI bus, function and device number of the slot to which it is coupled. As a result, the bootable device coupled to PCI to PCI bridge 39 may be enumerated with a bus, device and function numbers unlike those of any slot included in the architecture of computer system 10. Therefore, the PCI bus, function and device number for any unmatched slots may be compared to the PCI bus, function and device number of unmatched, enumerated devices in computer system 10. Once a match is found between a slot and an enumerated device, the device number of the root bridge or slot may be obtained and associated with the bootable device preferably indirectly coupled thereto as mentioned above and the method depicted in FIG. 3 may proceed to step 54*g*.

Once the bus number range for each host bridge 16*a*, 16*b* and 16*c*, as well as the device number for the root bridge or slot when necessary, have been obtained, the host bridge 16*a*, 16*b* and 16*c* to which each bootable device is connected is preferably used in conjunction with a variety of other device variables, such as those described above, to create a unique identifier or signature. As mentioned above, in one embodiment of the identifier or signature created at step 54*f*, the vendor ID, device ID, PCI host bridge, PCI function, and PCI device number, as well as the PCI root bridge device number where necessary, of each device are combined to create a unique six byte identifier.

At step 54*h*, the identifier or signature for each device is stored, preferably in nonvolatile memory. One method of storing the identifier, as mentioned above, involves storing the PCI vendor ID and the PCI device ID as a thirty two (32) bit device ID and storing the host bridge number, PCI device number, PCI function number and possibly the PCI device number of the root bridge as a sixteen (16) bit device signature. Other methods and configurations of storing the unique identifier are considered within the scope of the present disclosure.

Once the identifier for each device has been created and stored, the identifiers are available for use in building new boot tables as mentioned above, as well as for building boot tables for previous system configurations for comparison and for other purposes in which unique identification may be desired. By identifying bootable devices as disclosed herein, problems such as the misidentification of PnP expansion headers and not uniquely identifying multiples of the same type device are eliminated. In addition to being used to compare bootable device configurations through power cycles, the method for tracking bootable devices may also be used to uniquely identify bootable devices in a setup routine preferably included in BIOS ROM 26 of computer system 10.

As part of such a setup routine, the user may change the boot order of computer system 10. The user of computer system 10 preferably has the option of entering the setup routine at each boot of computer system 10. After computer system 10 scans its system memory 18 and performs other basic system checks as mentioned above, and prior to the loading of an operating system at step 56 of FIG. 2, the user may be presented with the following instructions: "PRESS F2 TO ENTER SETUP." The current boot order of computer system 10 is preferably stored in nonvolatile memory and may be accessed by a boot order routine of the system BIOS. The data that was collected for each bootable device of the computer system is preferably stored in nonvolatile memory by the system BIOS in the event a computer user enters the setup routine. Upon entering setup, computer system 10 preferably displays the current boot order.

Figure 4:
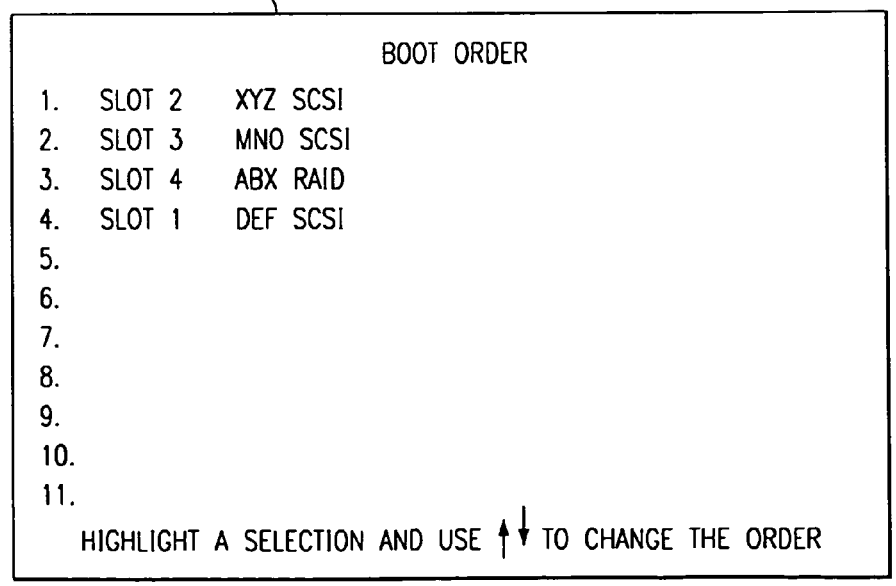
FIG. 4 is a schematic drawing showing one example of a setup screen according to teachings of the present disclosure.

Should a user elect to enter computer system's 10 setup routine, boot order screen 60 of FIG. 4 preferably displays the current boot order of computer system 10. In the example of FIG. 4, the boot order of computer system 10 begins with the "XYZ Co. SCSI Adapter" located in slot 2, and ends with "DEF Co. SCSI Adapter" located slot 1. In operation, computer system 10, represented in FIG. 1, will generally attempt to boot from the devices in the sequence listed in the stored boot order. The boot order listing of boot order screen 60 may also contain information in addition to a listing of the names and associated slots of the bootable devices. As such, the boot order listing of boot order screen 60 generally identifies the vendor and device ID as well as a physical location of each bootable device in computer system 10. The vendor and device ID of each PCI device are preferably read from a header on each device and may be stored in nonvolatile memory 28 as described above.

According to teachings of the present disclosure, the PCI bus number assigned to each device coupled thereto may vary depending on the components sharing the bus. It is this potential change in bus assignments that may create the limitations in the previous methods discussed above. As such, identifying a bootable device by its bus number may result in improperly recognizing an existing device as a new device when new devices are added to or existing devices are removed from computer system 10 causing bus number assignments to be rearranged.

The listing of bootable devices on boot order screen 60 identifies both the boot order of the listed devices, as well as the location of the bootable devices in computer system 10. In those cases where two bootable devices are identical, and therefore have identical vendor and device IDs, the bootable devices can be positively identified by their location in computer system 10. Using the identification method disclosed herein, a computer user will be able to accurately identify and manipulate the boot order of the bootable devices by reading the boot order screen and visually inspecting the slots of computer system 10. The identification of the location of each bootable device in boot order screen 60 allows a computer user to select among duplicate bootable devices in computer system 10.

A user is given the opportunity to modify the boot order of computer system 10 while in setup. This may be accomplished on boot order screen 60 by highlighting a bootable device and using the up arrow or down arrow keys of a keyboard to move the device up or down in the boot order. As an example, to move a bootable device lower in the boot order, the user would preferably highlight the bootable device, using either a pointing device or keys on a keyboard, and then use the down arrow key to move the device until the device has reached its desired position in the boot order. Once the user has adjusted the boot order of bootable devices, the user closes the setup program, computer system 10 saves the new boot order in nonvolatile memory 28 and computer system 10 reboots according to the newly saved boot order.

The system and method for tracking bootable devices in a computer system of the present disclosure permits the user to more easily determine device identities as well as modify the current boot order of a computer system. If the user wishes to boot the computer system to run one of Windows 98, Windows NT, or Linux, the system and method of the present disclosure allows the user to more easily switch among bootable devices without resorting to a trial and error approach for determining the boot order of the present system and for booting the system to one of several operating systems stored in system hardware. With the identification convention disclosed herein, the user can easily associate a particular bootable device to a particular operating system, even in those instances in which different operating systems, Windows NT and Linux, for example, are installed in identical bootable devices. The system and method is particularly useful in those instances in which the computer system includes multiple bootable devices that have the same or similar device names.

Although the disclosed embodiments have been described in detail, it should be understood that various changes, substitutions and alterations can be made to the embodiments without departing from their spirit and scope.

What is claimed is:

1. A computer system comprising:
   at least two installed bootable devices, each bootable device having a respective host bridge associated therewith, each host bridge connecting one of the bootable devices to a host bus; and
   a computer readable medium storing identification data for each of the installed bootable devices; and
   the identification data including host bridge identification data.

2. The computer system of claim 1 wherein the installed bootable devices comprise PCI devices.

3. The computer system of claim 1 wherein the identification data further comprises a function number and a device number for each of the installed bootable devices.

4. The computer system of claim 1 wherein the identification data further comprises a vendor identification and a device identification obtained from each of the installed bootable devices.

5. The computer system of claim 1 further comprising:
   a BIOS stored in the computer readable medium; and
   the BIOS operable to access the identification data for each of the installed bootable devices and to display a list of the installed bootable devices in the computer system; and
   the list including identification of a slot to which each of the installed bootable devices is coupled such that each of the installed bootable devices is uniquely identified.

6. The computer system of claim 5 wherein the BIOS further comprises:
   a setup routine;
   the setup routine operable to display the installed bootable devices in a boot order; and
   the setup routine further operable to modify the boot order.

7. The computer system of claim 1 wherein the identification data further comprises a device number associated with a slot to which the bootable device is coupled.

8. A method for identifying bootable devices in a computer system, the method comprising:
   determining a bus number for each bootable device;
   determining a host bridge number associated with each bus number of the computer system, wherein the host bridge number is associated with one of a plurality of host bridges, each host bridge connecting a bootable device to a host bus;
   reading identification data stored on each bootable device in the computer system; and
   creating an identifier for each bootable device from at least the host bridge number and the identification data read from each bootable device.

9. The method of claim 8 wherein the identification data includes a vendor identification and a device identification.

10. The method of claim 8 further comprising:
    determining a function number and a device number for each bootable device; and
    incorporating the function number and the device number of each bootable device into the identifier.

11. The method of claim 8 wherein identifying at least two identical bootable devices comprises:
    reading vendor identification and device identification from identification data stored on each identical bootable device;
    determining a PCI function number and a PCI device number for each identical bootable device; and
    creating an identifier for each identical bootable device from the vendor identification, device identification, PCI function number, PCI device number and host bridge number such that each identical bootable device may be uniquely identified.

12. The method of claim 8 further comprising displaying the identifier for one or more of the bootable devices in a setup routine.

13. The method of claim 8 further comprising displaying the identifier for one or more of the bootable devices in a boot order.

14. The method of claim 8 further comprising:
    creating a slot list including a bus number, device number and function number associated with each slot of the computer system;

comparing a bus number, device number and function number associated with each bootable device to respective values in the slot list;

determining the device number of the slot to which each bootable device having a bus number, device number and function number which does not match respective values associated with each slot in the slot list is coupled; and including the device number of the slot in the identifier for the bootable device.

15. A method for uniquely identifying bootable devices coupled to one or more slots in a computer system, the method comprising:

comparing a bus number, device number and function number associated with each of the bootable devices to a bus number, device number and function number associated with each of the slots;

determining a host bridge number associated with each bootable device having a bus number, device number and function number matching the bus number, device number and function number of a slot, wherein the host bridge number is associated with one of a plurality of host bridges, each host bridge connecting a bootable device to a host bus; and creating an identifier for each bootable device based on at least the host bridge number and identification data maintained by the bootable device.

16. The method of claim 15 further comprising creating a slot list including the bus number, device number and function number of each slot in the computer system.

17. The method of claim 15 further comprising reading the identification data from a memory maintained by the bootable device.

18. The method of claim 15 further comprising storing the identifier for each bootable device in a memory of the computer system.

19. The method of claim 15 further comprising:

determining the device number of the slot to which each bootable device having a bus number, device number and function number that is different from the bus number, device number and function number associated with each slot is coupled; and including the device number of the slot in the identifier for each bootable device.

20. The method of claim 15 further comprising displaying at least a portion of the identifier in a setup routine.

* * * * *